United States Patent
Merino-Lopez et al.

(10) Patent No.: US 8,609,758 B2
(45) Date of Patent: *Dec. 17, 2013

(54) PNEUMATIC ARTICLE PROVIDED WITH A SELF-SEALING COMPOSITION

(75) Inventors: José Merino-Lopez, Riom (FR); Pierre Lesage, Clermont-Ferrand (FR); Bozena Voge, Cournon d'Auvergne (FR)

(73) Assignees: Michelin Recherche et Technique S.A., Granges-Paccot (CH); Compagnie General des Etablissments Michelin, Clermont-Ferrand (FR)

( * ) Notice: Subject to any disclaimer, the term of this patent is extended or adjusted under 35 U.S.C. 154(b) by 191 days.

This patent is subject to a terminal disclaimer.

(21) Appl. No.: 12/741,736

(22) PCT Filed: Oct. 27, 2008

(86) PCT No.: PCT/EP2008/009072
§ 371 (c)(1),
(2), (4) Date: Oct. 12, 2010

(87) PCT Pub. No.: WO2009/059709
PCT Pub. Date: May 14, 2009

(65) Prior Publication Data
US 2011/0198009 A1 Aug. 18, 2011

(30) Foreign Application Priority Data
Nov. 9, 2007 (FR) .................................... 07 58895

(51) Int. Cl.
*C08K 5/00* (2006.01)
*B29C 73/16* (2006.01)
*B60C 19/12* (2006.01)

(52) U.S. Cl.
USPC ............ 524/474; 152/502; 152/510; 428/912

(58) Field of Classification Search
USPC .................. 524/487, 474, 515; 152/502, 503; 106/33; 523/166
IPC .......................... B29C 73/00,73/16; C09K 3/10
See application file for complete search history.

(56) References Cited

U.S. PATENT DOCUMENTS

| 4,113,799 A | 9/1978 | Van Ornum et al. |
| 4,138,378 A * | 2/1979 | Doss ............................. 524/273 |

(Continued)

FOREIGN PATENT DOCUMENTS

| EP | 1 090 069 | 7/2004 |
| FR | 2910478 A1 * | 6/2008 |

(Continued)

OTHER PUBLICATIONS

JP 2004-149704A (2004), machine translation, JPO Advanced Industrial Property Network (AIPN).*

(Continued)

*Primary Examiner* — David W Wu
*Assistant Examiner* — Josephine Chang
(74) *Attorney, Agent, or Firm* — Cozen O'Connor

(57) ABSTRACT

An inflatable article such as a pneumatic tire provided with a puncture-resistant layer comprising, by way of a self-sealing composition, an elastomer composition comprising at least, as predominant elastomer, a thermoplastic styrene (TPS) elastomer, more than 200 phr of an extender oil and more than 20 phr of a hydrocarbon resin, the glass transition temperature of which is greater than 0° C. The puncture-resistant layer is advantageously combined with an airtight layer, for example based on butyl rubber, so as to form, in the pneumatic article, an airtight puncture-resistant laminate.

23 Claims, 1 Drawing Sheet

(56) References Cited

U.S. PATENT DOCUMENTS

| | | | |
|---|---|---|---|
| 4,228,839 A | | 10/1980 | Böhm et al. |
| 4,396,053 A | * | 8/1983 | Davis et al. .................. 152/504 |
| 4,426,468 A | | 1/1984 | Ornum et al. |
| 4,445,562 A | * | 5/1984 | Bohm et al. .................. 152/504 |
| 4,913,209 A | * | 4/1990 | Hong et al. .................. 152/504 |
| 5,436,295 A | * | 7/1995 | Nishikawa et al. .......... 525/92 C |
| 5,552,489 A | * | 9/1996 | Merrill et al. ................ 525/210 |
| 2004/0031550 A1 | | 2/2004 | Kanenari et al. |
| 2004/0092648 A1 | * | 5/2004 | Jones et al. .................. 524/502 |
| 2010/0051158 A1 | * | 3/2010 | Albert et al. ................ 152/503 |

FOREIGN PATENT DOCUMENTS

| | | |
|---|---|---|
| JP | 2004149704 A * | 5/2004 |
| WO | WO9962998 A1 * | 12/1999 |
| WO | WO03101709 A1 * | 12/2003 |

OTHER PUBLICATIONS

JP 2004-149704 A (2004), machine translation, JPO Advanced Industrial Property Network (AIPN).*

* cited by examiner

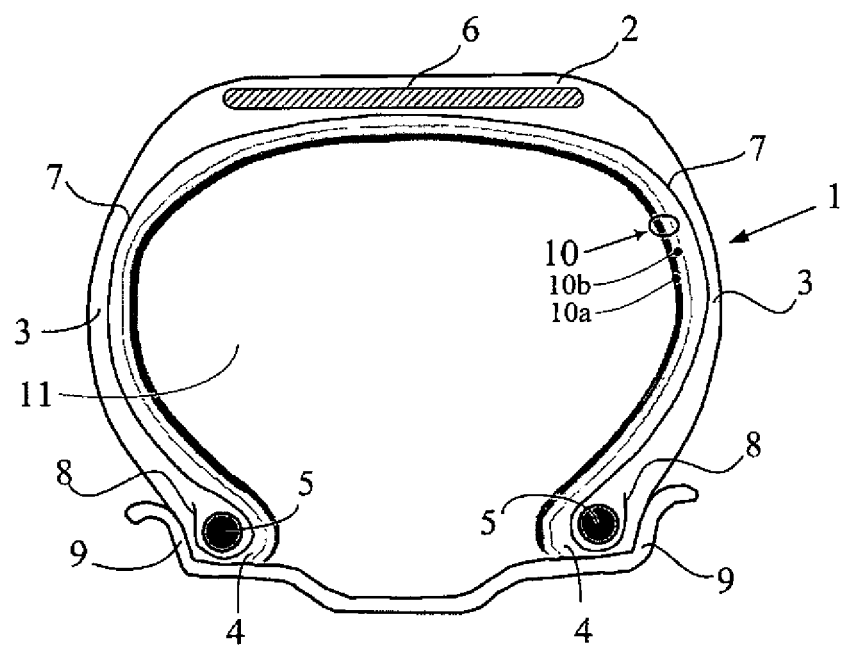

PNEUMATIC ARTICLE PROVIDED WITH A SELF-SEALING COMPOSITION

RELATED APPLICATIONS

This is a U.S. national stage under 35 USC §371 of application No. PCT/EP2008/009072, filed on Oct. 27, 2008.

This application claims the priority of French application Ser. No. 07/58895 filed Nov. 9, 2007, the entire content of which is hereby incorporated by reference.

FIELD OF THE INVENTION

The present invention relates to self-sealing compositions and to their use as puncture-resistant layers in any type of "inflatable" article, i.e., by definition, any article that assumes its usable shape when it is inflated with air.

The invention relates more particularly to the use of such compositions in inflatable articles, in particular in tires, for sealing off any holes due to perforations in service.

BACKGROUND OF THE INVENTION

In recent years, in particular, tire manufacturers have made particularly strenuous efforts to develop novel ways of solving a problem dating back from the very start of the use of wheels fitted with inflated tires, namely how to allow a vehicle to continue to travel despite a substantial or total loss of pressure of one or more tires. For decades, the spare wheel was considered to be the only and universal solution. Then, more recently, the considerable advantages of possibly dispensing with the spare tire have appeared. The concept of "extended mobility" was developed. The associated techniques allow the vehicle to run with the same tire, dependent on certain limitations to be respected, after a puncture or a pressure drop. This makes it possible for example to get to a point of repair without having to stop, often in hazardous circumstances, to fit the spare wheel.

Self-sealing compositions that can achieve such an objective, which by definition are capable automatically, i.e. without any external intervention, of sealing a tire in the event of it being punctured by a foreign body, such as a nail, have been particularly difficult to develop.

To be able to be useful, a self-sealing layer must satisfy many conditions of a physical and chemical nature. It must in particular be effective over a very wide operating temperature range and over the entire lifetime of the tires. It must be capable of closing up the hole when the puncturing object remains in place and, when the latter is expelled, it must be able to fill the hole and seal the tire.

Many solutions have been conceived, but have not been able to be developed in vehicle tires, especially owing to the lack of stability over time or the lack of effectiveness under extreme operating temperature conditions.

To help to remain effective at high temperature, document U.S. Pat. No. 4,113,799 (or FR-A-2 318 042) has proposed as self-sealing layer a composition comprising a combination of partially crosslinked butyl rubbers of high and low molecular weights, possibly in the presence of a small portion of a thermoplastic styrene elastomer. For good sealing effectiveness, said composition contains 55% to 70% by weight of a tackifier.

Document U.S. Pat. No. 4,228,839 has proposed as self-sealing layer for a pneumatic tire a rubber compound containing a first polymer material that degrades when irradiated, such as polyisobutylene, and a second polymer material that crosslinks when irradiated, preferably a butyl rubber.

Document U.S. Pat. No. 4,426,468 has also proposed a self-sealing composition for a pneumatic tire based on crosslinked butyl rubber of very high molecular weight.

A known drawback of butyl rubbers is that they suffer large hysteretic losses (high level of tan δ) over a wide temperature range, which drawback has repercussions on the self-sealing compositions themselves, giving them a large increase in hysteresis and considerably degrading the rolling resistance of tires.

The Applicants have moreover found that these butyl-rubber-based compositions may also be insufficiently effective after the delayed expulsion or removal of a puncturing object that has remained in place for a long period of time in the pneumatic tire structure.

Document EP-B1-1 090 069 has proposed, for its part, self-sealing compositions containing no butyl rubber, the specific formulation of which comprises, per 100 parts by weight of a based styrene-based thermoplastic elastomer, 80 to 140 parts of a liquid plasticizer, 110 to 190 parts of a tackifying resin and 2 to 20 parts of an additive.

SUMMARY OF THE INVENTION

The Applicants have discovered, during their research, a self-sealing composition which does not require butyl rubber and exhibits, in an inflatable article, an improved puncture-resistant performance compared to the self-sealing compositions of the prior art, particularly during use at a high temperature. Compared with the usual self-sealing compositions, it substantially improves the rate of sealing of a hole left after removal, especially delayed removal, of a puncturing object.

Thus, according to a first object, the present invention relates to an inflatable article provided with a puncture-resistant layer comprising, by way of a self-sealing composition, an elastomer composition comprising at least, as predominant elastomer, a thermoplastic styrene (TPS) elastomer, more than 200 phr of an extender oil and more than 20 phr of a hydrocarbon resin, the glass transition temperature ($T_g$) of which is greater than 0° C. (phr=parts per hundred parts of rubber by weight).

Preferably, the inflatable article of the invention, especially a pneumatic tire, also comprises an airtight layer which, combined with the above puncture-resistant layer, constitutes an airtight puncture-resistant laminate that is particularly advantageous when said laminate is placed, for example, on the inner wall of said inflatable article or pneumatic tire.

The present invention relates particularly to the pneumatic tires intended to be fitted on motor vehicles of the passenger or grand touring type, SUV (Sport Utility Vehicle) type, two-wheeled vehicles (especially motorcycles, bicycles), aircraft, industrial vehicles, chosen from vans, heavy vehicles—i.e. underground trains, buses, road transport vehicles (lorries, towing vehicles, trailers), off-road vehicles, such as agricultural and civil-engineering vehicles—, and other transport or handling vehicles.

BRIEF DESCRIPTION OF THE SINGLE DRAWING

The invention and its advantages will be readily understood in the light of the description and the exemplary embodiments that follow, and also the single FIGURE relating to these embodiments that shows schematically, in radial cross section, a pneumatic tire with a radial carcass reinforcement using a self-sealing composition in accordance with the present invention.

DETAILED DESCRIPTION OF THE SINGLE DRAWING

In the present description, unless otherwise indicated, all the percentages (%) indicated are % by weight.

Moreover, any interval of values denoted by the expression "between a and b" represents the range of values going from more than a to less than b (i.e. excluding the bounds, a and b) whereas any interval of values denoted by the expression "from a to b" means the range of values going from a up to b (i.e. including the strict bounds a and b).

I-1. Self-Sealing Composition

The self-sealing composition or material used in accordance with the invention is an elastomer composition comprising at least, as predominant elastomer, a thermoplastic styrene elastomer and, as plasticizers, an extender oil with a weight content of greater than 200 phr and more than 20 phr of a hydrocarbon resin, the $T_g$ of which is greater than 0° C.

I-1-A. Thermoplastic Styrene Elastomer

The thermoplastic styrene (TPS) elastomers are thermoplastic elastomers in the form of styrene-based block copolymers.

Having a structure intermediate between thermoplastic polymers and elastomers, they consist, as is known, of hard polystyrene blocks linked by soft elastomer blocks, for example polybutadiene, polyisoprene or poly(ethylene-butylene) blocks. They are often triblock elastomers with two hard segments linked by a soft segment. The hard and soft segments may be in a linear, star or branched configuration.

Preferably, the TPS elastomer is chosen from the group consisting of styrene/butadiene/styrene (SBS), styrene/isoprene/styrene (SIS), styrene/butadiene/isoprene/styrene (SBIS), styrene/isobutylene/styrene (SIBS), styrene/ethylene-butylene/styrene (SEBS), styrene/ethylene-propylene/stirene (SEPS) and styrene/ethylene-ethylene-propylene/styrene (SEEPS) block copolymers and blends of these copolymers.

More preferably, said elastomer is chosen from the group formed by SEBS copolymers, SEPS copolymers and blends of these copolymers.

According to another preferred embodiment of the invention, the styrene content in the TPS elastomer is between 5 and 50%. Below the indicated minimum, the thermoplastic nature of the elastomer runs the risk of being substantially reduced, whereas above the recommended maximum the elasticity of the composition may be adversely affected. For these reasons, the styrene content is more preferably between 10 and 40%, in particular between 15 and 35%.

It is preferable for the $T_g$ (measured by DSC (Differential Scanning Calorimetry) according to ASTM D3418, 1999) of the TPS elastomer to be below −20° C., more preferably below −40° C.

A $T_g$ value above these minimum temperatures, meaning a higher $T_g$ of the self-sealing composition itself, may reduce the performance of the self-sealing composition when used at very low temperature. For such a use, the $T_g$ of the TPS elastomer is more preferably even below −50° C.

The number-average molecular weight (denoted by $M_n$) of the TPS elastomer is preferably between 50 000 and 500 000 g/mol, more preferably between 75 000 and 450 000 g/mol. Below the minimum values indicated, the cohesion between the TPS elastomer chains, because of its dilution (amount of extender), runs the risk of being degraded. Moreover, an increase in the usage temperature runs the risk of adversely affecting the mechanical properties, especially the properties at break, consequently leading to reduced "hot" performance.

Moreover, too high a molecular weight $M_n$ may be detrimental as regards the flexibility of the composition at the recommended extender oil contents. Thus, it has been found that an $M_n$ lying within the 250 000 to 400 000 range was particularly suitable, especially for use of the self-sealing composition in a pneumatic tire.

The number-average molecular weight ($M_n$) of the TPS elastomer is determined, in a known manner, by SEC (steric exclusion chromatography). The specimen is firstly dissolved in tetrahydrofuran with a concentration of about 1 g/l and then the solution is filtered on a filter of 0.45 μm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series, namely a STYRAGEL HMW7 column, a STYRAGEL HMW6E column and two STYRAGEL HT6E columns, is used. The injected volume of the polymer specimen solution is 100 μl The detector is a WATERS 2410 differential refractometer and its associated software for handling the chromatograph data is the WATERS MILLENNIUM system. The calculated average molecular weights are relative to a calibration curve obtained with polystyrene standards.

The TPS elastomer may constitute all of the elastomer matrix or the predominant portion by weight (preferably for more than 50% and more preferably for more than 70%) of the matrix when it includes one or more other elastomers, whether thermoplastic or not, for example elastomers of the diene type.

According to a preferred embodiment, the TPS elastomer is the sole elastomer and the sole thermoplastic elastomer present in the self-sealing composition.

TPS elastomers, such as for example SEPS or SEBS, extended in particular with high levels of oils, are well known and commercially available. As examples of commercial TPSs in extended form, mention may be made of the products sold by Vita Thermoplastic Elastomers or VTC ("VTC TPE group") under the name "Dryflex" (e.g. "Dryflex 967100") or "Mediprene" (e.g. "Mediprene 500 000M"), and those sold by Multibase under the name "Multiflex" (e.g. "Multiflex G00"). These products, developed in particular for medical, pharmaceutical or cosmetic applications, may be processed conventionally in respect of TPEs by extrusion or moulding, for example starting from a raw material available in bead or granule form.

Of course, TPS elastomers are also available in non-extended form. As examples, mention may be made of the elastomers of SEBS or SEPS type sold by Kraton under the name "Kraton G" (e.g. products G1650, G1651, G1654, G1730) or by Kuraray under the name "Septon" (e.g. S2005, 52006, 58004, S8006).

These TPS elastomers have proved to be capable, after adjustment of their extender oil content and addition of a hydrocarbon resin, within the recommended ranges, of fulfilling the function of an effective self-sealing composition, as will be explained in detail in the remainder of the document.

I-1-B. Extender Oil

The second essential constituent of the self-sealing composition is an extender oil (or plasticizing oil) used in a very high amount of greater than 200 phr—i.e. more than 200 parts per hundred parts of total elastomer by weight (i.e., TPS elastomer plus, where appropriate, additional elastomer(s))—, preferably greater than 250 phr.

Any extender oil may be used, preferably one having a weakly polar character, capable of extending or plasticizing elastomers, especially thermoplastic elastomers.

At ambient temperature (23° C.), these oils, which are relatively viscous, are liquids (i.e. as a reminder, substances having the capability of eventually taking the form of their container), as opposed especially to resins which are by nature solids.

Preferably, the extender oil is chosen from the group formed by polyolefin oils (i.e. those resulting from the polymerization of olefins, monoolefins or diolefins), paraffinic oils, naphthenic oils (of low or high viscosity), aromatic oils, mineral oils and mixtures of these oils.

More preferably, the extender oil is chosen from the group formed by polybutenes, paraffinic oils and mixtures of these oils. Even more preferably, a polyisobutene oil, in particular a polyisobutylene ("PIB") oil, is used.

Examples of polyisobutylene oils include those sold in particular by Univar under the trade name "Dynapak Poly" (e.g. "Dynapak Poly 190"), by BASF under the trade name "Glissopal" (e.g. "Glissopal 1000") or "Oppanol" (e.g. "Oppanol B12"); paraffinic oils are sold for example by Exxon under the trade name "Telura 618" or by Repsol under the brand name "Extensol 51".

The number-average molecular weight ($M_n$) of the extender oil is preferably between 200 and 30 000 g/mol, more preferably still between 300 and 10 000 g/mol. For excessively low $M_n$ values, there is a risk of the oil migrating to the outside of the self-sealing composition, whereas excessively high $M_n$ values may result in this composition becoming too stiff. An $M_n$ value between 350 and 4000 g/mol, in particular between 400 and 3000 g/mol, proves to be an excellent compromise for the intended applications, in particular for use in a pneumatic tire.

The number-average molecular weight ($M_n$) of the extender oil is determined by SEC, the specimen being firstly dissolved in tetrahydrofuran with a concentration of about 1 g/l and then the solution is filtered on a filter of 0.45 μm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the trade name "STYRAGEL HT6E" is used. The injected volume of the polymer specimen solution is 100 μl The detector is a WATERS 2410 differential refractometer and its associated software for handling the chromatograph data is the WATERS MILLENNIUM system. The calculated average molecular weights are relative to a calibration curve obtained with polystyrene standards.

A person skilled in the art will know, in the light of the description and the embodiments that follow, how to adjust the quantity of extender oil according to the particular usage conditions of the self-sealing composition, in particular of the inflatable article in which it is intended to be used.

It is preferable for the extender oil content to be between 200 and 700 phr, more preferably between 250 and 600 phr. Below the indicated minimum, the self-sealing composition runs the risk of having too high a rigidity for certain applications, whereas above the recommended maximum there is a risk of the composition having insufficient cohesion. For this reason, the extender oil content is more preferably between 300 and 500 phr, especially for use of the self-sealing composition in a pneumatic tire.

I-1-C. Hydrocarbon Resin

The third essential constituent of the self-sealing composition is a hydrocarbon resin, the $T_g$ of which is greater than 0° C., preferably greater than +20° C., said resin being used at a weight content greater than 20 phr, preferably greater than 30 phr, in particular at least equal to 50 phr.

As is known to those skilled in the art, the term "resin" is reserved in the present application, by definition, for a compound which is, on the one hand, solid at room temperature (23° C.) (as opposed to a liquid plasticizer such as an oil) and, on the other hand, compatible (i.e. miscible at the content used) with the elastomer composition for which it is intended, so as to act as a true diluent.

Hydrocarbon resins are polymers well known to those skilled in the art which can be used, in particular, as plasticizers or tackifiers in polymer matrices. They have been described, for example, in the work entitled "*Hydrocarbon Resins*" by R. Mildenberg, M. Zander and G. Collin (New York, VCH, 1997, ISBN 3-527-28617-9), Chapter 5 of which is devoted to their applications, especially in rubber tires (5.5. "Rubber Tires and Mechanical Goods"). They may be aliphatic, aromatic or hydrogenated aromatic, or of the aliphatic/aromatic type, i.e. based on aliphatic and/or aromatic monomers. They may be natural or synthetic resins, based on petroleum (also known in such a case as petroleum resins) or not based on petroleum.

According to one particular embodiment of the invention, the hydrocarbon resin has at least any one of the following characteristics:
- a $T_g$ greater than 20° C., especially greater than 30° C.;
- a number-average molecular weight ($M_n$) of between 400 and 2000 g/mol, especially between 500 and 1500 g/mol; and
- a polydispersity index (PI) of less than 3, especially less than 2 (it will be recalled that PI=$M_w/M_n$ where $M_w$ is the weight-average molecular weight).

More particularly, this hydrocarbon resin has all of the above characteristics.

The $T_g$ is measured according to the standard ASTM D3418 (1999). The macrostructure ($M_w$, $M_n$, and PI) of the hydrocarbon resin is determined by steric exclusion chromatography (SEC): tetrahydrofuran solvent; 35° C. temperature; 1 g/l concentration; 1 ml/min flow rate; solution filtered on a 0.45 μm porosity filter before injection; Moore calibration with polystyrene standards; set of 3 "WATERS" columns in series ("STYRAGEL" HR4E, HR1 and HR0.5 columns); differential refractometer ("WATERS 2410") detection and its associated operating software ("WATERS EMPOWER").

As examples of such hydrocarbon resins, mention may be made of those chosen from the group formed by cyclopentadiene (CPD) or dicyclopentadiene (DCPD) homopolymer or copolymer resins, terpene homopolymer or copolymer resins, $C_5$-cut homopolymer or copolymer resins and blends of these resins. Among the above copolymer resins, mention may more particularly be made of those chosen from the group formed by (D)CPD/vinylaromatic copolymer resins, (D)CPD/terpene copolymer resins, (D)CPD/$C_5$-cut copolymer resins, terpene/vinylaromatic copolymer resins, $C_5$-cut/vinylaromatic copolymer resins and blends of these resins.

The term "terpene" comprises here, as is known, alpha-pinene, beta-pinene and limonene monomers. It is preferable to use a limonene monomer, a compound which, as is known, is in the form of three possible isomers: L-limonene (laevorotatory enantiomer), D-limonene (dextrorotatory enantiomer) or else dipentene, the racemic mixture of the dextrorotatory and laevorotatory enantiomers. Suitable vinylaromatic monomers are for example styrene, phenol, alpha-methylstyrene, ortho-, meta- and para-methylstyrene, vinyltoluene, para-tert-butylstyrene, methoxystyrenes, chlorostyrenes, vinylmesitylene, divinylbenzene, vinylnaphthalene and any vinylaromatic monomer derived from a $C_9$-cut (or more generally from a $C_8$ to $C_{10}$-cut).

More particularly, mention may also be made of the resins chosen from the group formed by (D)CPD homopolymer resins, (D)CPD/styrene copolymer resins, polylimonene resins, limonene/styrene copolymer resins, limonene/D(CPD) copolymer resins, $C_5$-cut/styrene copolymer resins, $C_5$-cut/$C_9$-cut copolymer resins and blends of these resins.

All the above resins are well known to those skilled in the art and are commercially available, for example sold by DRT under the name "Dercolyte" with regard to polylimonene resins, by Neville Chemical Company under the name "Super Nevtac" or by Kolon under the name "Hikorez" with regard to $C_5$-cut/styrene or $C_5$-cut/$C_9$-cut resins, or else by Struktol under the name "40 MS" or "60 NS" (blends of aromatic and/or aliphatic resins).

The hydrocarbon resin content is preferably between 20 and 200 phr, more preferably in a range of 50 to 150 phr. Below these minimum values, the puncture-resistant performance may prove to be insufficient at high temperature, typically above 70° C., whereas above the recommended maximum values, there is a risk of an insufficient mechanical strength and/or thermal resistance of the material.

I-1-D. Various Additives

The three constituents described above, namely the TPS elastomer, the extender oil and the hydrocarbon plasticizing resin, are sufficient by themselves for the self-sealing composition to completely fulfill its puncture-resistance function with regard to inflatable articles in which it is used.

However, various other additives may be added, typically in a small amount (preferably with contents of less than 20 phr, more preferably less than 10 phr), such as for example reinforcing fillers, such as carbon black, non-reinforcing or inert fillers, lamellar fillers, stabilizers, such as UV stabilizers, antioxidants or antiozonants, various other stabilizers, and colouring agents, advantageously those that can be used for colouring the self-sealing composition.

Apart from the elastomers described above (TPS and other optional elastomers), the self-sealing composition may also contain, again in a minor weight fraction relative to the TPS elastomer, polymers other than elastomers, such as for example thermoplastic polymers compatible with the TPS elastomer.

1-2. Use of the Self-Sealing Composition as Puncture-Resistant Layer

The self-sealing composition or material described above is an elastic solid compound at 23° C., which is especially characterized, thanks to its specific formulation, by a very high flexibility and deformability.

It can be used as puncture-resistant layer in any type of "inflatable" article, i.e. by definition, any article that assumes its usable shape when it is inflated with air.

As examples of such inflatable articles, mention may be made of inflatable boats, balloons and balls used for games or sports.

Said composition is particularly suitable for use as puncture-resistant layer in an inflatable article, whether a finished or semi-finished product, made of rubber, most particularly in a pneumatic tire for a motor vehicle, such as a two-wheeled, passenger or industrial vehicle, or a non-motorized vehicle, such as a bicycle.

Such a puncture-resistant layer is preferably placed on the inner wall of the inflatable article, completely or at least partly covering it, but it may also be completely integrated into its internal structure.

The thickness of the puncture-resistant layer is preferably greater than 0.3 mm, more preferably between 0.5 mm and 10 mm (in particular between 1 and 5 mm).

It will be readily understood that, depending on the specific fields of application and on the dimensions and pressures involved, the method of implementing the invention may vary, the puncture-resistant layer then having several preferential thickness ranges. Thus, for example, in the case of passenger vehicle tires, it may have a thickness of at least 0.5 mm, preferably between 1 and 5 mm. According to another example, in the case of commercial or agricultural vehicle tires, the preferred thickness may be between 1 and 6 mm. According to another example, in the case of tires for vehicles in the civil engineering field or for aircraft, the preferred thickness may be between 2 and 10 mm. Finally, according to another example, for bicycle tires, the preferred thickness may be between 0.4 and 2 mm.

The self-sealing composition described here has the advantage of exhibiting, over a very wide range of pneumatic tire operating temperatures, practically no degradation in rolling resistance compared with a pneumatic tire that does not include such a self-sealing layer. Compared with the usual self-sealing compositions, it very substantially improves the rate of sealing of the hole left in particular after delayed removal of a puncturing object.

Moreover, the usual self-sealing compositions are very susceptible to creep. When tires are running, said compositions are often expelled from the sidewall part of these tires due to the effect of the centrifugal forces and accumulate under their crown part. This is not the case for the compositions recommended by the present invention, which may be placed throughout the inner part of the tires.

Finally, quite unexpectedly, the self-sealing composition described here has displayed puncture-resistant performances that are very substantially improved during use at high temperature, typically above 70° C. or even higher, such as those encountered, for example, during a sustained running of a tire at very high speed.

Of course, the invention applies to cases in which the self-sealing composition described above is used in a pneumatic tire or in any other inflatable article without it necessarily being combined with an airtight layer.

However, according to a particular and preferred embodiment of the invention, the self-sealing composition is combined with at least an airtight second layer, to form an airtight self-sealing multilayer laminate that can be used in particular as inner wall of an inflatable article such as a pneumatic tire.

The second layer of the laminate may comprise any type of material capable of fulfilling the function of a film impermeable to air (or more generally to gases), which may for example be a metallic material or a polymer material. Preferably, this airtight layer has a thickness of greater than 0.05 mm, and more preferably between 0.05 and 6 mm (for example from 0.1 to 2 mm).

According to a preferred embodiment, this airtight second layer comprises a butyl rubber composition. The term "butyl rubber" should be understood, as is known, to mean an isobutylene/isoprene copolymer (the abbreviation IIR) and halogenated, preferably chlorinated or brominated, versions of this type of copolymer. Preferably, the butyl rubber is a halogenated butyl rubber or a blend of halogenated and non-halogenated butyls. The butyl rubber may be used by itself or in combination with one or more other elastomers, especially one or more diene elastomers, such as for example natural rubber or a synthetic polyisoprene. The airtight composition also contains the various additives usually present in the airtight layers known to those skilled in the art, such as reinforcing fillers, like carbon black, lamellar fillers that improve the sealing (e.g. phyllosilicates such as kaolin, talc, mica, clays or organomodified clays (called "organo clays")), stabilizers, such as antioxidants or antiozonants, a crosslinking system (for example a sulphur-based or peroxide-based system), various processing aids and other stabilizers.

The two layers of the laminate above may be assembled by any suitable means, for example by a simple heat treatment, preferably under pressure (for example for a few minutes at 150° C. under a pressure of 16 bar), with the aid of various adhesives or else by inserting an adhesive third layer fastening the other two layers together.

The self-sealing composition and the multilayer laminate described above can be advantageously used in tires of all vehicle types, particularly in tires for passenger vehicles which are capable of running at a very high speed or tires for industrial vehicles, such as to heavy goods vehicles which are capable of running and operating under particularly high internal temperature conditions.

As an example, the single appended FIGURE shows very schematically (not drawn to scale) a radial cross section of a pneumatic tire according to the invention.

This pneumatic tire 1 has a crown 2 reinforced by a crown reinforcement or belt 6, two sidewalls 3 and two beads 4, each of these beads 4 being reinforced with a bead wire 5. The crown 2 is surmounted by a tread (not shown in this schematic FIGURE). A carcass reinforcement 7 is wound around the two bead wires 5 in each bead 4, the upturn 8 of this reinforcement 7 lying for example towards the outside of the pneumatic tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the circumferential mid-plane (the plane perpendicular to the rotation axis of the pneumatic tire, which is located at mid-distance of the two beads 4 and passes through the middle of the crown reinforcement 6).

The pneumatic tire 1 is characterized in that its inner wall includes a multilayer laminate (10) comprising at least two layers (10a, 10b), said laminate being self-sealing thanks to its first layer (10a) and airtight thanks to its second layer (10b).

In accordance with a preferred embodiment of the invention, the two layers (10a, 10b) cover substantially the entire inner wall of the pneumatic tire, extending from one sidewall to the other, at least as far as the rim flange when the pneumatic tire is in the fitted position. In other possible embodiments, the layer 10a could however cover only a portion of the airtight region (layer 10b), for example only the crown region of the pneumatic tire, or could extend at least from the crown region down to the shoulders or down to the mid-point of the sidewall (equator) of said pneumatic tire.

According to another preferred embodiment, the laminate is placed in such a way that the self-sealing first layer (10a) is radially outermost in the pneumatic tire relative to the other layer (10b), as shown schematically in the appended FIGURE. In other words, the self-sealing layer (10a) covers the airtight layer (10b) on the side facing the internal cavity 11 of the pneumatic tire 1. Another possible embodiment is that in which this layer (10a) is radially innermost relative to the other layer (10b), then placed between the airtight layer (10b) and the rest of the structure of the pneumatic tire 1.

In this example, the layer 10b (with a thickness of 0.7 to 0.8 mm) is based on butyl rubber having a conventional formulation for an inner liner, which usually defines, in a conventional pneumatic tire, the radially internal face of said pneumatic tire intended to protect the carcass reinforcement from diffusion of air coming from the internal space of the pneumatic tire. This airtight layer 10b therefore enables the pneumatic tire 1 to be inflated and kept under pressure. Its sealing properties enable it to guarantee a relatively low rate of pressure loss, making it possible to keep the pneumatic tire inflated, in the normal operating state, for a sufficient time, normally several weeks or several months.

The layer 10a itself consists of a self-sealing composition comprising the three essential constituents which are an SEBS elastomer ("G1654" from Kraton) (with a styrene content of about 30%, a $T_g$ close to −60° C. and an M, of around 150 000 g/mol), a polyisobutylene extender oil ("Dynapak 190" from Univar—$M_n$ of around 1000 g/mol) with a weight content of about 400 phr, and a hydrocarbon resin of the aromatic type (Struktol® "40MS Flakes" from Struktol) with a weight content of about 100 phr.

The above self-sealing composition was prepared as follows. The three constituents (SEBS, oil and resin) were mixed conventionally, using a twin-screw extruder (L/D=40), at a temperature typically above the melting point of the composition (around 190° C.). The extruder used comprised two different feeds (hoppers) (SEBS on the one hand, resin on the other hand) and a pressurized liquid injection pump for the polyisobutylene extender oil; it was provided with a die enabling the product to be extruded to the desired dimensions.

The layer 10a, therefore placed between the layer 10b and the cavity 11 of the pneumatic tire, provides the pneumatic tire with effective protection against pressure losses due to accidental perforations, by enabling these perforations to be automatically sealed.

If a foreign body such as a nail passes through the structure of the inflatable article, for example a wall such as a sidewall 3 or the crown 6 of the pneumatic tire 1, the composition serving as self-sealing layer is subjected to several stresses. In reaction to these stresses, and thanks to its advantageous deformability and elasticity properties, said composition creates a sealed contact region around the entire body. It matters little whether the outline or profile of said body is uniform or regular, the flexibility of the self-sealing composition enabling it to penetrate into minute openings. This interaction between the self-sealing composition and the foreign body seals up the region affected by the latter.

In the event of the foreign body being removed, whether accidentally or intentionally, a perforation remains, which can generate a relatively substantial leak, depending on its size. The self-sealing composition, exposed to the hydrostatic pressure, is sufficiently flexible and deformable to close up, by deforming, the perforation, preventing the inflation gas from leaking out. Especially in the case of a pneumatic tire, it has turned out that the flexibility of the self-sealing composition can withstand without any problem the forces from the surrounding walls, even during deformation phases of the loaded pneumatic tire and when the latter is running.

The pneumatic tire provided with its puncture-resistant layer (10a) as described above may be produced before or after vulcanization (curing).

In the first case (i.e. before the pneumatic tire is vulcanized), the self-sealing composition is simply applied in a conventional manner at the desired place, so as to form the layer 10a. The vulcanization is then carried out conventionally. The TPS elastomers are well able to withstand the stresses associated with the vulcanization step.

An advantageous manufacturing variant, for a person skilled in the art of tires, would consist for example during a first step in laying down the self-sealing composition flat, directly on a building drum, in the form of a skim with a suitable thickness (for example 2 to 6 mm), before this is covered with the airtight layer followed by the rest of the structure of the pneumatic tire, according to the manufacturing techniques well known to a person skilled in the art. This type of process also makes it possible for the second embodiment in which the airtight layer 10b is radially outermost to be easily implemented.

In the second case (i.e. after vulcanization of the pneumatic tire), the self-sealing composition is applied to the inside of the cured pneumatic tire, by any appropriate means, for example by bonding, by spraying or by extrusion and blow moulding a film of suitable thickness.

During trials, two tires (sizes "27/68-18") mounted at the rear of a sports car (Porsche 997) were tested. The inner wall of one of the tires (already including the airtight layer 10b) was covered, shoulder to shoulder, with the self-sealing layer (10a) described above, with a thickness of 4.5 mm, and then the tires were vulcanized.

The pneumatic tires, equipped with pressure and temperature sensors, were first subjected to a high-speed pre-running test of sufficient duration to bring them to their operating temperature (internal temperature above +70° C.).

Then, on the pneumatic tire according to the invention (comprising the self-sealing layer) in the heated state, four perforations 6 mm in diameter and two perforations 2 mm in diameter were produced, through the tread and the crown block using punches that were immediately removed.

The running test was resumed immediately. Unexpectedly, this pneumatic tire withstood being run at 180 km/h, for 1 hour, without loss of pressure, after which time the running test was stopped.

With no self-sealing composition and under the same conditions as above, the pneumatic control tire (comprising no self-sealing composition) perforated in the same way loses pressure in less than one minute, becoming completely unsuitable for being driven.

The same experiment was then carried out by lowering to about 100 phr (i.e. by reducing by a factor of about 4) the content of PIB oil ("Dynapak 190") in a composition that was otherwise identical to that described previously, comprising the SEBS elastomer ("G1654"), the extender oil and the 100 phr of hydrocarbon resin (Struktol® "40MS Flakes"). The corresponding pneumatic control tire, that is consequently distinguished from the preceding tire according to the invention only by its extender oil content of less than 200 phr, was perforated in the same way but firstly at low temperature and statically (i.e., without pre-running): this control tire proved to lose its inflation pressure in less than three minutes, such a result rendering it, of course, completely unsuitable for a high-temperature running test on a vehicle.

The invention claimed is:

1. An inflatable article provided with a puncture-resistant layer comprising, by way of a self-sealing composition, an elastomer composition comprising at least, as predominant elastomer, a thermoplastic styrene (TPS) elastomer, more than 200 phr of an extender oil and more than 20 phr of a hydrocarbon resin, the hydrocarbon resin having a glass transition temperature ($T_g$) greater than 0° C.

2. The article according to claim 1, wherein the TPS elastomer is chosen from the group consisting of styrene/butadiene/styrene, styrene/isoprene/styrene, styrene/butadiene/isoprene/styrene, styrene/isobutylene/styrene, styrene/ethylene-butylene/styrene, styrene/ethylene-propylene/styrene and styrene/ethylene-ethylene-propylene/styrene block copolymers and blends of these copolymers.

3. The article according to claim 2, wherein the TPS elastomer is selected from the group consisting of styrene/ethylene-butylene/styrene copolymers, styrene/ethylene-propylene/styrene copolymers and blends of these copolymers.

4. The article according to claim 1, wherein the TPS elastomer comprises between 5 and 50% styrene by weight.

5. The article according to claim 1, wherein a glass transition temperature ($T_g$) of the TPS elastomer is below −20° C.

6. The article according to claim 1, wherein the number-average molecular weight ($M_n$) of the TPS elastomer is between 50 000 and 500 000 g/mol.

7. The article according to claim 1, wherein the extender oil is selected from the group consisting of polyolefin oils, paraffinic oils, naphthenic oils, aromatic oils, mineral oils and mixtures of these oils.

8. The article according to claim 7, wherein the extender oil is selected from the group consisting of polybutenes, paraffinic oils and mixtures of these oils.

9. The article according to claim 8, wherein the extender oil is a polyisobutylene oil.

10. The article according to claim 1, wherein the number-average molecular weight ($M_n$) of the extender oil is between 200 and 30 000 g/mol.

11. The article according to claim 1, wherein the extender oil content is between 200 and 700 phr.

12. The article according to claim 1, wherein the hydrocarbon resin content is between 20 and 200 phr.

13. The article according to claim 1, wherein the hydrocarbon resin has a $T_g$ greater than +20° C.

14. The article according to claim 1, wherein the number-average molecular weight ($M_n$) of the hydrocarbon resin is between 400 and 2 000 g/mol.

15. The article according to claim 1, wherein the hydrocarbon resin is selected from the group consisting of cyclopentadiene or dicyclopentadiene homopolymer or copolymer resins, terpene homopolymer or copolymer resins, $C_5$-cut homopolymer or copolymer resins, and blends of these resins.

16. The article according to claim 15, wherein the hydrocarbon resin is selected from the group consisting of cyclopentadiene or dicyclopentadiene homopolymer resins, cyclopentadiene or dicyclopentadiene/styrene copolymer resins, polylimonene resins, limonene/styrene copolymer resins, limonene/cyclopentadiene or dicyclopentadiene copolymer resins, $C_5$-cut/styrene copolymer resins, $C_5$-cut/$C_9$-cut copolymer resins, and blends of these resins.

17. The article according to claim 1, wherein the self-sealing composition is used in the form of a puncture-resistant layer, the thickness of which is greater than 0.3 mm.

18. The article according to claim 17, wherein the puncture-resistant layer has a thickness of between 0.5 mm and 10 mm.

19. The article according claim 1, wherein the puncture-resistant layer is deposited on the inner wall of the inflatable article.

20. The article according to claim 1, wherein the inflatable article is a rubber article.

21. The article according to claim 20, wherein the inflatable article is a pneumatic tire.

22. The article according to claim 1, wherein the puncture-resistant layer is combined with an airtight layer, thus forming an airtight self-sealing laminate.

23. The article according to claim 22, wherein the airtight layer is based on butyl rubber.

* * * * *